United States Patent Office 3,242,333
Patented Mar. 22, 1966

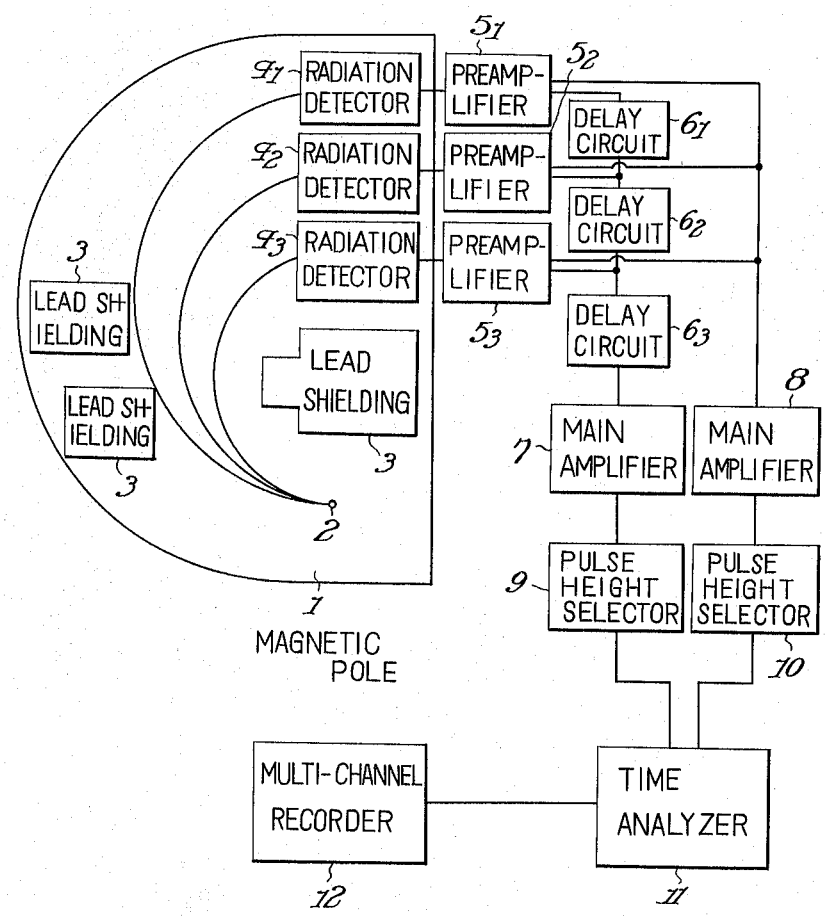

3,242,333
MULTI-CHANNEL CHARGED PARTICLE SPEC-
TROMETER WITH DELAY MEANS TO SEQUEN-
TIALLY RECORD DETECTOR SIGNALS
Hisashi Yamamoto, Musashino-shi, Japan, assignor to
Kabushiki Kaisha Hitachi Seisakusho, Tokyo-to, Japan,
a joint-stock company of Japan
Filed Dec. 24, 1962, Ser. No. 246,717
1 Claim. (Cl. 250—41.9)

This invention relates to charged-particle spectrometry, and more particularly it relates to a new multi-channel, charged-particle spectrometer having several highly desirable features.

A conventional charged-particle spectrometer, for example, a magneto-type beta-ray spectrometer, is provided with a single detector fixed at a certain position thereof and is so adapted as to cause variation in the intensity of a magnetic field for detecting radiation so as to measure the momentum spectrum of the beta rays. In general, however, the resolution power of a beta-ray spectrometer is extremely high, and it is necessary to use a large number of measurement points. Consequently, long measuring time is required for one cycle of measurements, and, especially in the case of a spectrometer with iron core, it is difficult, because of the iron core hysteresis, to suspend measurement at an intermediate point, and in some cases several days may be required for completion of measurement. Additionally, such conventional spectrometers requiring an extremely long time for one cycle of measurements have had further disadvantages such as their being totally unsuitable for detection of short-life radio isotopes.

Accordingly, in order to overcome these disadvantages, spectrometers so adapted as to deflect radiation by means of a homogeneous magnetic field and, at the same time, to accomplish incidence printing on photographic negatives, thereby making possible simultaneous measurement of a broad momentum range, have been proposed. However, in such apparatus, the sensitivity of the photographic negative with respect to radiation is low, and such an apparatus also requires a long time for measurement, and, moreover, since the intensity of radiation is measured by the degree to which the negative is blackened, such measurement is subject to errors.

It is an object of the present invention in its broader aspects to eliminate the above-mentioned disadvantages in spectrometers of the conventional type.

More specifically, it is an object of the invention to provide a new multi-channel, charged-particle spectrometer of substantially simple construction yet being capable of accurate measurement of a broad range of spectra in an extremely short time.

The nature, principle, and details of the invention, as well as the manner in which the foregoing objects may be best achieved, will be most clearly understood by reference to the following description, set forth principally with respect to a preferred embodiment of the invention, when taken in conjunction with the accompanying drawing which is a block diagram indicating the compositional arrangement of the embodiment.

This embodiment, which is a semi-circular focusing, beta-ray spectrometer provided with a homogeneous field, comprises: a magnetic pole 1; a radiation source 2; a lead shielding 3; radiation detectors $4_1$, $4_2$, and $4_3$ which have narrow incidence widths, and which consist of such components as solid detectors, proportional counters, or GM counters; preamplifiers $5_1$, $5_2$, and $5_3$; delay circuits $6_1$, $6_2$, and $6_3$ are connected to the output sides of the preamplifiers $5_1$, $5_2$, and $5_3$, respectively, and, at the same time, are mutually connected in series; main amplifiers 7 and 8; pulse height selectors 9 and 10; a time analyzer 11 which is so adapted as to be capable of generating pulses in accordance with the time difference of the output pulses of the amplifiers 9 and 10; and a multi-channel recorder 12.

The spectrometric apparatus composed of the above-stated components has the following operation. Beta-rays emitted from the radiation source 2 are subjected to deflection, due to a magnetic field, in accordance with momentum and are selectively projected into the radiation detectors $4_1$, $4_2$, and $4_3$.

Then, the counting output of the beta-ray projected into, for example, the detector $4_1$ is amplified by the preamplifier $5_1$, and one portion of the amplified output of the preamplifier $5_1$ is connected to the main amplifier 8 and introduced into the pulse height selector 10, by which pulses of a certain height or higher are selected and introduced into the time analyzer 11. Another portion of the output of the preamplifier $5_1$ is suitably time delayed by the delay circuits $6_1$, $6_2$, and $6_3$ and is introduced, by way of the main amplifier 7, into the pulse height selector 9, where pulses of a certain height or higher are selected and introduced into the time analyzer 11.

In the time analyzer 11, the time difference of the output pulses from the pulse height selector 10 are converted into signals for selecting a channel of the multi-channel recorder 12 corresponding to the radiation detector $4_1$, whereby the channel of the multi-channel recorder 12 corresponding to the radiation detector $4_1$ is selected and the output pulses from the pulse height selector 9 are recorded in said channel.

Similarly, the counting outputs of the detectors $4_2$ and $4_3$ also pass through the circuit of the main amplifier 8 and the pulse height selector 10 and the circuit of the delay circuits $6_2$ and $6_3$, the main amplifier 7, and the pulse height selector 9 and are introduced into the time analyzer 11. In this case, however, since the counting output of the detector $4_2$ passes through the delay circuits $6_2$ and $6_3$, and the output of the detector $4_3$ passes through only the delay circuit $6_3$, the detected time differences in the time analyzer 11, and consequently the signals for selecting the channels to be produced in response to these time differences, differ in correspondence with the respective detectors $4_1$, $4_2$ and $4_3$. Accordingly, the output pulses from the pulse height selector 9 are introduced in the time analyzer 11 and then recorded in the channels corresponding to the respective radiation detectors of the multi-channel recorder 12.

In the foregoing description, for the sake of convenience in exposition, the case of three beta-ray detectors in parallel arrangement was taken as an example, but it is possible to accomplish measurement over a broad range in a short time by increasing the numbers of the detectors and delay circuits. In this case, if, with the increase in the number of series-connected delay circuits, the attenuation in these circuits becomes great, attenuation obstruction may be prevented by adding an amplifier in each delay circuit. Furthermore, by using a time-to-pulse height converter for the time analyzer 11, it is also possible to use a multi-channel pulse height analyzer of the type commercially available on the market for the recorder 12.

As described above, the present invention provides a multi-channel, charged-particle spectrometer so arranged that, by its operation, charged particles such as emitted beta-rays are deflected by means of a magnetic field; each spectrum is projected selectively into a different detector; and, at the same time, the outputs of the various detectors are delayed by a mutually different time and are introduced selectively into mutually different channels of a multi-channel time analyzer to be analyzed and measured. The term "multi-channel time analyzer" denotes a time analyzer provided with a multi-channel recorder, the two devices being combined in a single construction. Accordingly, by the use of the spectrometer of this invention, measurement of all spectra can be accomplished in an extremely short time. Furthermore, since this spectrometer requires only two sets of main amplifiers, pulse height selectors, and other related parts, regardless of the number of radiation detectors and their corresponding delay circuits, the circuit arrangement has such advantages as substantial simplicity.

Although the present invention has been described with respect to a particular embodiment thereof, it is not to be so limited as changes and modifications can be made therein which are within the full intended scope of the invention, as defined by the appended claim.

What is claimed is:

A multi-channel, charged particle spectrometer comprising, in combination, a radiation source for emitting charged particles; a plurality of radiation detectors; means for creating an electromagnetic field to deflect said charged particles and selectively project each momentum of said particles into a different radiation detector; a plurality of preamplifiers connected to the outputs of said radiation detectors, the output of each preamplifier being divided into two parallel paths, the first path passing through a common first main amplifier and a first pulse height selector in series connection, and the second path passing through series-connected delay circuits of the same number as said preamplifiers; a second main amplifier, and a second pulse height selector in series connection, said second path of each preamplifier being connected to the input side of a different one of said delay circuits; the outputs of said first and second pulse height selectors being connected to a common time analyzer; and a multi-channel recorder connected to said time analyzer for converting the delayed output signals into signals into signals to be counted and recorded in different channels of said recorder.

References Cited by the Examiner
UNITED STATES PATENTS

| | | | |
|---|---|---|---|
| 2,436,503 | 2/1948 | Cleveland | 250—83.6 |
| 2,601,097 | 6/1952 | Crawford | 250—41.9 |
| 2,654,064 | 9/1953 | Broding | 346—34 |
| 2,725,479 | 11/1955 | Parkins | 250—41.9 |
| 2,771,596 | 11/1956 | Bellamy | 346—34 |
| 2,793,345 | 5/1957 | Hags | 250—83.3 |

RALPH G. NILSON, *Primary Examiner.*

W. F. LINDQUIST, *Assistant Examiner.*